March 12, 1929.  A. OTTO  1,705,265

PRESSURE EQUALIZER

Filed Oct. 6, 1926

INVENTOR
ALBERT OTTO
BY
ATTORNEY

Patented Mar. 12, 1929.

1,705,265

UNITED STATES PATENT OFFICE.

ALBERT OTTO, OF DETROIT, MICHIGAN, ASSIGNOR TO MORGAN AND WRIGHT, OF DETROIT, MICHIGAN, A CORPORATION OF MICHIGAN.

PRESSURE EQUALIZER.

Application filed October 6, 1926. Serial No. 139,840.

This invention relates to a device for equalizing and centering the forces of compression exerted between two elements. More particularly it relates to a pressure equalizer for a vulcanizing press.

In the vulcanization of articles such as tires, the molds containing the tires are stacked upon each other on the platen of a vulcanizing press, which platen is actuated by a hydraulic ram, and the ram operated to press the molds between the platen and the head of the press. In this operation difficulty has been experienced in keeping the molds in proper alignment due to various causes, such as mis-alignment of the ram platen and the top of the press, shifting of the anchor bolts of the press, careless loading of the molds in the press, etc. If the molds are not in proper alignment, one or more of them will remain slightly open, allowing the rubber to flow out in the opening and so distort the carcasses of the tires in these molds that it is frequently necessary to grade them as seconds and in some cases to scrap them entirely.

It is an object of this invention to provide an equalizer for centering the forces exerted in a press so that molds will not open during the pressing operation.

It is a further object to provide an equalizer or centering device which operates invariably without attention.

Another object is to provide an equalizer as a part of or attached to the cover of a press so that it can be positioned in the press without any operation additional to that of applying the cover to the press.

The invention consists broadly in an attachment for a vulcanizing press comprising cooperating elements having surfaces universally movable with respect to each other, said elements being adapted to bear fixedly against one of the complementary pressure exerting members of the press and against an adjacent mold, the attachment being loosely connected to the press.

Figure 1:
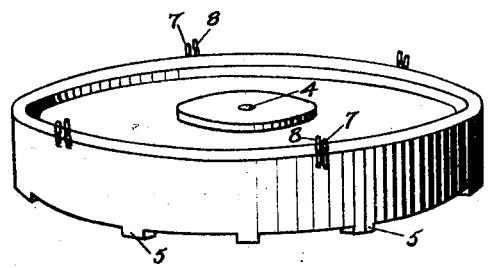
Figure 2:
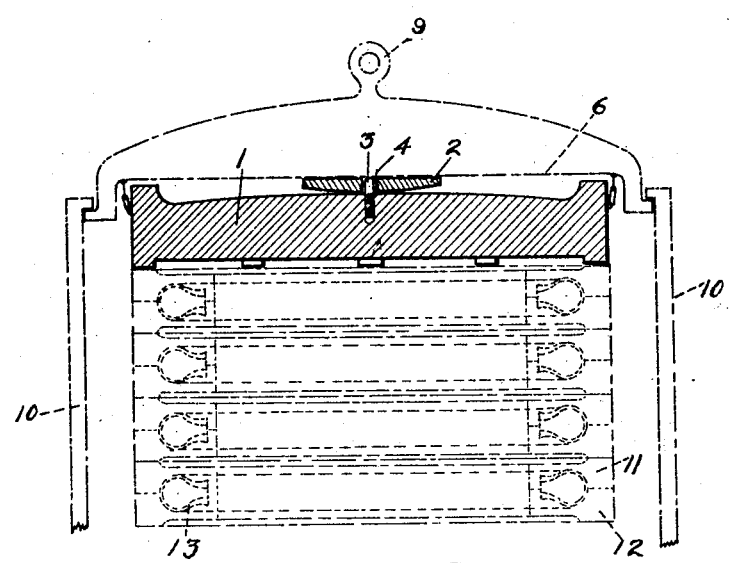

For a complete disclosure of the nature and objects of the invention, reference is had to the accompanying specification and drawings, in which latter:

Fig. 1 is a perspective view showing the base and top plate of the equalizer; and Fig. 2 is a transverse sectional view of the equalizer showing in dotted lines the upper portion of a press and the molds contained therein.

Referring to the drawings, the equalizer comprises a base 1 with plate 2 held in place by means of a centering pin 3 which has screw threaded engagement with the base 1 and projects into a hole 4 in the plate. The engaging faces of the base and plate are convex in shape so that free pivotal movement is permitted between them. The hole 4 is made sufficiently large with respect to the centering pin so that the pivoting action is not interfered with. The lower face of the base 1 is provided with a plurality of projections 5, the outer surfaces of which are in alignment. These projections are adapted to engage the flat upper face of the adjacent mold. The upper face of the plate 2 is made flat to correspond with the lower face of the cover 6 in order that it may rigidly engage the same. The base is secured to the cover 6 of the press by means of two sets of chains 7 and 8. One set 8 is made slightly longer than the other and is for use in case the set 7 breaks. The chains maintain the cover and equalizer as a unit which can be removed from the press by a hoist which engages the eye shaped lug 9. As a result, no additional labor is required of the operator in removing the equalizer than is required for removing the cover. Stacked below the equalizer within the press 10 upon a ram platen (not shown) are a plurality of molds, each mold formed of the sections 11 and 12. A tire 13 built of unvulcanized rubber composition is disposed within the sections 11 and 12 of the mold.

In the operation of the device, the cover and equalizer are elevated from the press and the ram platen advanced to a position at the top of the press. A mold containing a built up tire is placed upon the platen which is slowly lowered as succeeding molds are stacked thereon. In this operation the molds usually become somewhat tilted from the horizontal and out of alignment. Having filled the press, the cover with equalizer is lowered and secured in position. The ram platen is now forced upwardly and steam is turned on to vulcanize the rubber composition. Considerable force is exerted upon the ram to cause an upward thrust of the molds against the cover, the pressure serving to force the sections of each mold together. As the molds are forced upwardly, the top mold presses against the base, the bottom face of which rests, slightly inclined to the horizontal, upon the mold. The convex face of the base presses against the convex face of the plate and the flat face of the plate is in turn pressed against and held horizontal with the horizontal face of the cover. This causes the base and plate to tilt slightly with respect to each other upon their convex faces. Since the plate is positioned with the portions of its surfaces which contact with the base approximately in the middle of the convex face of the base, the forces of pressure are transmitted through the middle of the top mold. As a result, tilting of the molds is prevented. The combination of heat and pressure causes the rubber stock to flow in the molds and the sections of each mold tend to fit together with a resulting settling of the stack. The plate and base merely pivot on their convex surfaces to compensate for this settling. By the device described there has been provided an apparatus for centering the forces of compression of a press which is simple in construction and which can be used without any attention on the part of the operator other than is attached to the usual operation of raising and lowering the cover. The device functions without the application of any sort of lubricant and once installed upon an element of a press, does not fail to operate. Such a device readily adapts itself to the settling of the molds.

While the device has been described particularly with reference to its use within a press for tire molds, it is evident that it can be used in any sort of press where it is desirable to center the compressing forces. The outer surface of the plate has been described as being flat and the outer surface of the base as being provided with projections. These surfaces can be modified according to the character of the face against which they are to press so that non-pivotal engagement is had therewith. The thickness and size of the base and plate can be varied, it being desirable to construct them as light in weight as is consistent with the strength necessary to withstand the pressure. The plate instead of being a separate member may be an integral part of the cover.

Having thus described my invention what I claim and desire to protect by Letters Patent is:

1. In a tire vulcanizing press, a base member having a convex upper face and an under face, annularly arranged projections on said under face for engaging the uppermost tire mold of a stack, a cover member movable to permit the molds to be stacked in and removed from said press, an equalizer member interposed between said base member and said cover and having a convex lower face bearing against the convex upper face of said base member, and means for securing said members for pivotal engagement at the approximate middle of the convex face of each whereby compressing forces exerted through said members are centralized with respect thereto.

2. In a tire vulcanizing press, a cover movable to permit tire molds to be stacked in and removed from the press, a base member suspended from said cover by flexible connections to permit relative movement, an equalizer member interposed between said cover and said base member for centering the forces exerted in the press, said members having convex faces bearing against each other and one of said members having a centrally disposed pin projecting from the face thereof and the other member having a socket of greater cross sectional area than said pin to receive said pin and form therewith a loose pivotal connection between said members.

Signed at Detroit, county of Wayne, and State of Michigan, this 1st day of October, 1926.

ALBERT OTTO.